United States Patent [19]

Liautaud et al.

[11] Patent Number: 4,730,916
[45] Date of Patent: Mar. 15, 1988

[54] SPECTACLE TEMPLES

[76] Inventors: Philip J. Liautaud, 446 Balsam La., Palatine, Ill. 60067; Robert J. Boryca, 1442 Cindy La., Des Plaines, Ill. 60018

[21] Appl. No.: 442,034

[22] Filed: Nov. 16, 1982

[51] Int. Cl.⁴ ............................ G02C 5/18; G02C 5/14
[52] U.S. Cl. ..................................... 351/117; 351/123; 351/156
[58] Field of Search ............... 351/123, 156, 157, 111, 351/113, 117

[56] References Cited

U.S. PATENT DOCUMENTS 3,582,194  6/1971  Liautaud ............................. 351/156
3,701,591  10/1972  Wichers ........................... 351/156 X
3,944,344  3/1976  Wichers ........................... 351/156 X
4,271,538  6/1981  Montesi et al. ......................... 2/439

FOREIGN PATENT DOCUMENTS 1270406  4/1972  United Kingdom ............... 351/123

Primary Examiner—Rodney B. Bovernick
Attorney, Agent, or Firm—Hill, Van Santen, Steadman & Simpson

[57] ABSTRACT

A spectacle temple has a rigid forward section connected to a lens-carrying frame and an inwardly bowed resilient rear section of greater width which flexes to conform to the head of a wearer and provide a firm, gentle holding of the spectacles.

11 Claims, 6 Drawing Figures

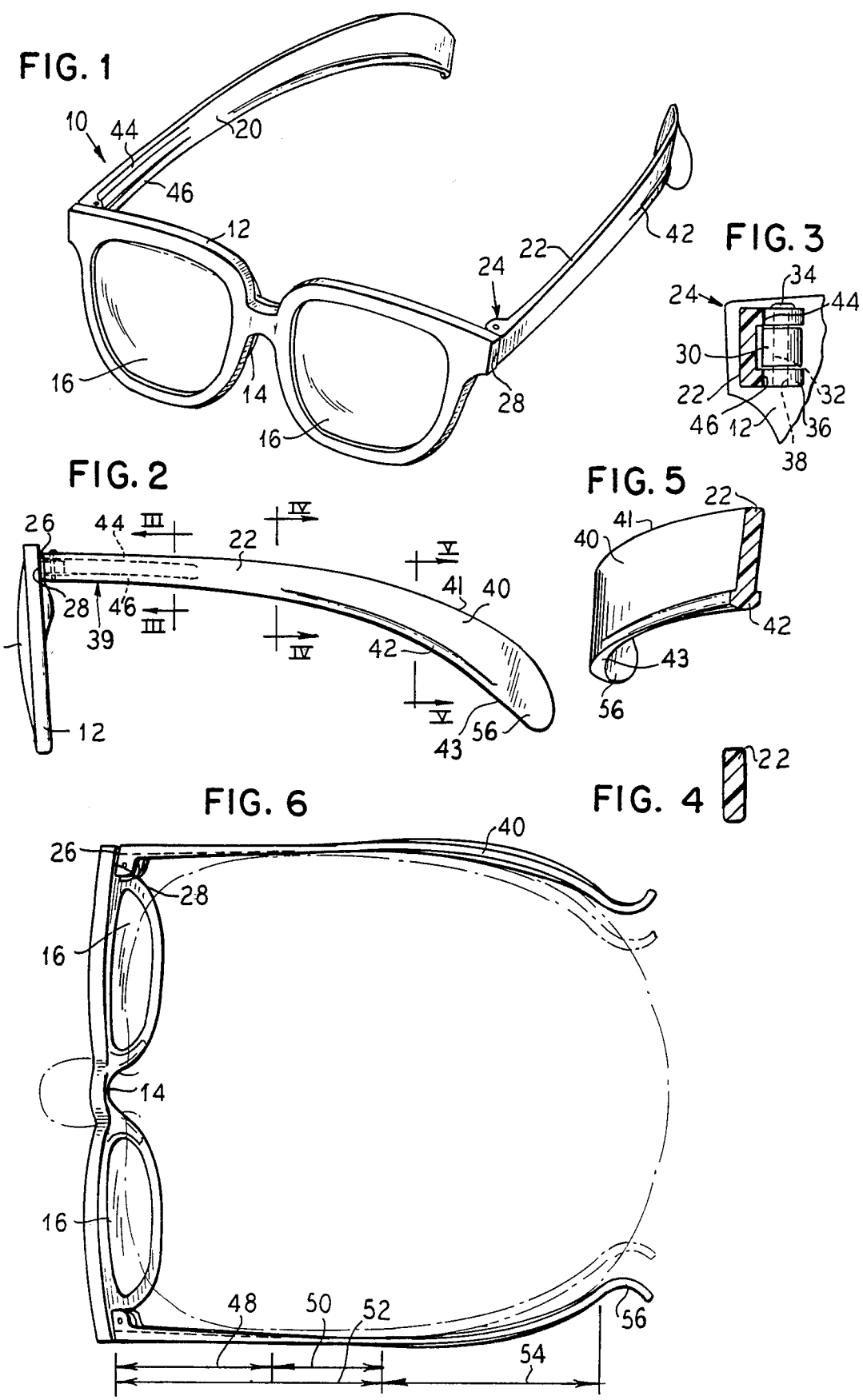

4,730,916

SPECTACLE TEMPLES

BACKGROUND OF THE INVENTION

1. Field of the Invention

The present invention relates to spectacles, and is more particularly concerned with new and improved spectacle temples.

2. Description of the Prior Art

In U.S. Pat. No. 3,582,194 Philip J. Liautaud discloses a spectacle structure in which the distal end of a relatively rigid temple of dielectric plastic material has vertical grooves therein so that a slight pressure against the distal ends, as by a resilient band therebetween, causes the temples to conform to the head of the wearer.

As pointed out by Liautaud, the springiness of prior temples constructed of yieldable metal caused discomfort to many persons, in particular to those persons not accustomed to wearing eyeglasses. As also pointed out other attempts to positively secure spectacles in place utilized strong elastic bands, for example, which are relatively uncomfortable over longer periods of time.

SUMMARY OF THE INVENTION

It is the object of the present invention to provide a new and improved spectacle temple which fits all persons without adjustment, automatically adjusts to the head of the wearer and at least partially embraces the back of the head of a wearer to firmly, but gently hold the spectacle in place.

The above object is achieved, according to the present invention, by providing a temple which includes a rigid portion attached to an eyeglass or goggle frame and a resilient portion extending rearwardly therefrom which is normally bowed inwardly and which has an outwardly bowed distal end. As used herein, the terms "inwardly" and "outwardly" are with respect to the head of a wearer. Flexing of the resilient sections outwardly as the spectacles are donned biases the resilient sections to return inwardly and automatically adjust to the head of the wearer. The outward bow of the distal end facilitates donning by acting as somewhat of a skid to aid in outward flexing of the resilient section and to prevent the tip of the distal end from causing discomfort during donning of the spectacles and during wearing of the spectacles.

According to one feature of the invention, a pair of tapered ridges project inwardly of the rigid section for stiffening which provides a generally flat temple section which does not appreciably yield.

According to another feature of the invention, the lower edge of the resilient section may be provided with a somewhat greater thickness so that any weight of the spectacles applied to the top of the ear is distributed.

BRIEF DESCRIPTION OF THE DRAWINGS

Other objects, features and advantages of the invention, its organization, construction and operation will be best understood from the following detailed description, taken in conjunction with the accompanying drawing, on which:

FIG. 1 is a perspective view of spectacles constructed in accordance with the present invention;

FIG. 2 is a side elevation of the spectacles of FIG. 1;

FIG. 3 is a sectional view taken generally along the parting line III—III of FIG. 2;

FIG. 4 is a sectional view taken generally along the parting line IV—IV of FIG. 2;

FIG. 5 is a sectional view taken generally along the parting line V—V of FIG. 2; and FIG. 6 is a top view of the spectacles of FIGS. 1 and 2 shown on the head of a wearer.

DESCRIPTION OF THE PREFERRED EMBODIMENT

Referring to the drawing, spectacles are generally illustrated at 10 as comprising a frame 12 including a nose portion 14 and supporting a pair of lenses 16. It should be noted that the frame 12 may also support a single goggle-type lens and that the lens may be prescription, non-prescription, safety, tinted, polarized and the like.

Extending rearwardly of the frame 12 is a pair of temples 20, 22 which may be fixed to the frame 12 or pivotally secured thereto as by a hinge 24.

The hinge 24 is best illustrated in FIGS. 2 and 3 as having a forward end surface 28 which pivots toward and engages a rear surface 26 of the frame 12. The end surface 28 may be at an angle, for example 5°, from horizontal so that the temple is angled slightly inwardly to conform to the shape of the head when the frame 12 is properly positioned on the face of the wearer. A cylinder 30 projecting from the frame 12 with a vertical bore 32 therethrough and a pair of projections 36 each having a bore 38, the bores 32 and 38 receiving a hinge pin or screw 34.

A temple constructed in accordance with the present invention is best illustrated in FIGS. 2 and 4–6 as comprising a rigid portion 39 and a resilient, flexible portion 40. As seen in the sectional views of FIGS. 4 and 5, the temple is basically of rectangular cross section with the exception of the elements 42, 44 and 46. This thickness is in the range of 0.060–0.065 inches with the width of the ear protecting element 42 being approximately 0.075 inches. When made of a plastic material, such as polycarbonate, acetal or nylon, the portion 40 is sufficiently flexible to flex outwardly as the spectacles are donned and has sufficient springiness to embrace about the head as the spectacles are properly placed in the wearing position. However, it is desirable that the forward end of the temple lie flat; therefore, rigidity is provided at the forward end by a pair of ridges 44, 46 along the upper and lower edges which taper over a predetermined distance 48 from a temple thickness of, for example, 0.090 inches down to the aforementioned main body thickness of 0.060–0.065 inches. Therefore, rigidity is obtained for the forward portion 39 over a distance 48, flexing is permitted to begin over a straight portion of the temple 50 and when the spectacles are in place, the temple is generally straight over the distance 52.

As best seen in FIG. 6, the temples are normally bowed inwardly, as shown in phantom, flex outwardly as the spectacles are donned creating a spring bias, and flex inwardly about the head over a distance 54 under that bias as the distal portions 56 are moved to respective positions about the rear side of the head. The distal ends 56 are rounded for safety and comfort and are bowed outwardly to provide a skid-type structure which facilitates flexing of the resilient portions 40 and movement of the spectacles into the proper position.

As best seen in FIG. 2, the resilient portion 40 is much wider than the rigid portion 39. The greater width distributes the spring forces over a greater area so that the temples embrace the head gently, but firmly. The rigid section, however, may be of a much smaller width, particularly where it is desirable to have a view to the side. In one embodiment, the forward end is 0.3 inches and the upper and lower edges 41,43, respectively, gradually diverge to provide a maximum width of about 0.55 inches and then converge to form the rounded distal end 56. The upper and lower edges therefore define, in the area of the resilient, flexible portion 40, a rearward widening of the temple to achieve the gentle but firm embracing of the head through the distribution of spring forces over the wide area.

In summary, the temple of the present invention provides a positive and gentle holding of spectacles in place with an automatic adjustment to the head of the wearer.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. Spectacles comprising:

a frame and lens means carried by said frame; and a pair of temples each extending rearwardly of said frame and each comprising upper and lower edges including a rigid first section and a resilient second section therebetween, and a distal end, said first section pivotally connected to said frame and including a pair of ridges along the upper and lower edges of said temple, respectively, providing a U-shaped cross-section and tapering rearwardly towards said second section, and said second section connected to and extending rearwardly of said first section, said upper and lower edges extending divergently so that said second section includes a wide portion which is substantially wider than said first section and normally bowed inwardly so as to flex outwardly and then inwardly as the spectacles are donned to gently embrace and firmly hold the spectacles in place while distributing the resilient spring forces against the head to provide a firm and gentle fit thereto.

2. The spectacles of claim 1, wherein:

said distal end is an outwardly bowed distal end on each of said temples to initially engage the head of the wearer and flex said second section outwardly as the spectacles are donned.

3. The spectacles of claim 2, wherein:

said outwardly bowed distal end comprises a smooth rounded end edge.

4. The spectacles of claim 1, wherein said resilient second section comprises:

an inverted T-shaped cross-section at least in a range which would be located over the ear of a wearer.

5. The spectacles of claim 4, wherein:

the leg of the T is in a range of 0.060 and 0.065 inches in thickness; and the crossbar of the T is approximately 0.075 inches in thickness.

6. Spectacles comprising: a frame and lens means carried by said frame; and a pair of temples each constructed of plastic material, each extending rearwardly of said frame and each comprising upper and lower edges, a rigid first section and a resilient second section between said edges, and a distal end, said first section pivotally connected to said frame and including a pair of ridges along the upper and lower edges of said temple, respectively, providing a U-shaped cross-section and tapering rearwardly towards said second section, and said second section connected to and extending rearwardly of said first section, said upper and lower edges diverging rearwardly to define an inwardly bowed wide portion and then converging to define said distal end, said resilient second section flexing about and at least partially embracing and conforming to the head of a wearer and distributing the spring forces of said resilient second section over said wide portion to provide a firm and gentle fit.

7. Spectacles comprising:

a frame and at least one lens piece supported by said frame;

a pair of temples each connected to said frame to extend horizontally rearwardly thereof beyond the ear of a wearer, each of said temples comprising a rigid section connected to said frame, a distal end, and a resilient section extending rearwardly from said rigid section to said distal end and including upper and lower edges which diverge rearwardly to define an inwardly bowed wide portion and which then converge to define said distal end, said resilient section flexing about and at least partially embracing and conforming to the head of a wearer and distributing the spring forces of said resilient section over said wide portion to provide a firm, gentle fit, each of said temples further comprising an elongate body, and at least one stiffening ridge projecting from said body for a predetermined distance rearwardly of the connection to said frame.

8. The spectacles of claim 7, wherein:

said at least one stiffening ridge is a tempered ridge tapering rearwardly for said predetermined distance.

9. Spectacles comprising:

a frame and at least one lens piece supported by said frame;

a pair of temples each connected to said frame to extend horizontally rearwardly thereof beyond the ear of a wearer, each of said temples comprising a rigid section connected to said frame, a distal end, and a resilient section extending rearwardly from said rigid section to said distal end and including upper and lower edge which diverge rearwardly to define an inwardly bowed wide portion and which then converge to define said distal end, said resilient section flexing about and at least partially embracing and conforming to the head of a wearer and distributing the spring forces of said resilient section over said wide portion to provide a firm, gentle fit, each of said temples further comprising an elongate body, and a pair of stiffening ridges projecting from said body spaced apart, for a predetermined distance rearwardly of the connection to said frame.

10. Spectacles comprising:
a frame in at least one lens piece supported by said frame;
a pair of temples each connected to said frame to extend horizontally rearwardly thereof beyond the ear of a wearer,
each of said temples comprising
    a rigid section connected to said frame,
    a distal end, and
    a resilient section extending rearwardly from said rigid section to said distal end and including upper and lower edges which diverge rearwardly to define an inwardly bowed wide portion and which then converge to define said distal end, said resilient section flexing about and at least partially embracing and conforming to the head of a wearer and distributing the spring forces of said resilient sections over said wide portion to provide a firm, gentle fit,
each of said temples further comprising
    an elongated body having a first predetermined thickness in the area which is to be positioned over the ear and a greater, second predetermined thickness along the lower edge of said body in said area.

11. Spectacles comprising:
a frame in at least one lens piece supported by said frame
a pair of temples each connected to said frame to extend horizontally rearwardly thereof beyond the ear of a wearer,
each of said temples comprising
    a rigid section connected to said frame,
    a distal end, and
    a resilient section extending rearwardly from said rigid section to said distal end and including upper and lower edges which diverge rearwardly to define an inwardly bowed wide portion and which then converge to define said distal end, said resilient section flexing about and at least partially embracing and conforming to the head of a wearer and distributing the spring forces of said resilient section over said wide portion to provide a firm, gentle fit,
each of said temples further comprising
    an outwardly bowed portion at the distal end to initially engage the head and facilitate outward flexing of said resilient section as the spectacles are donned.

* * * * *